W. ROBERTSON.
FLEXIBLE EXPANSION COUPLING FOR ROTARY SHAFTS.
APPLICATION FILED JUNE 3, 1919.

1,358,467.

Patented Nov. 9, 1920.
3 SHEETS—SHEET 1.

W. ROBERTSON.
FLEXIBLE EXPANSION COUPLING FOR ROTARY SHAFTS.
APPLICATION FILED JUNE 3, 1919.
1,358,467.  Patented Nov. 9, 1920.
3 SHEETS—SHEET 3.
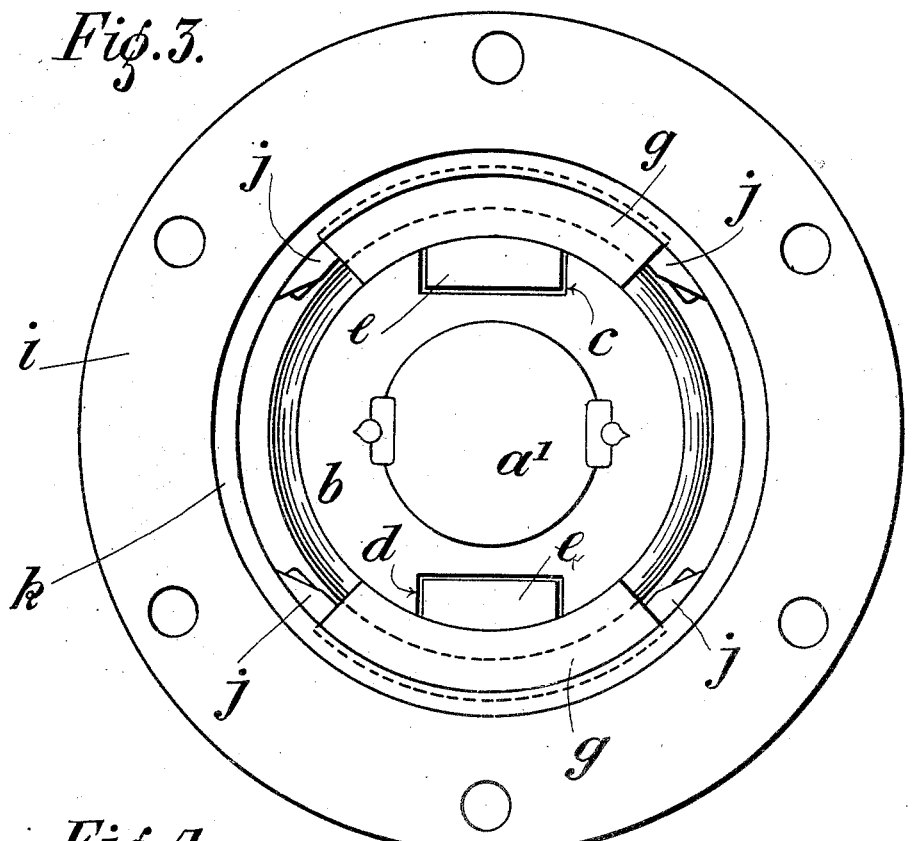
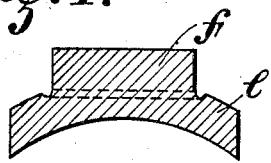
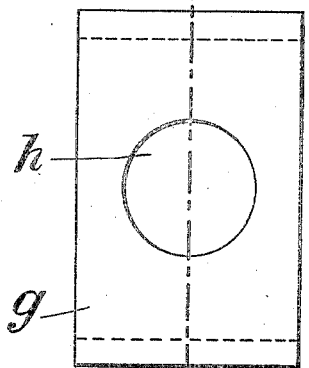
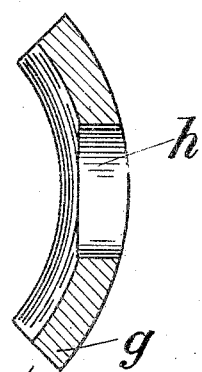
INVENTOR:
William Robertson.
BY Niederstein & Fairbanks.
ATTORNEYS.

# UNITED STATES PATENT OFFICE.

WILLIAM ROBERTSON, OF GLASGOW, SCOTLAND, ASSIGNOR OF ONE-HALF TO THE FAIRFIELD SHIPBUILDING & ENGINEERING COMPANY, LIMITED, OF GOVAN, GLASGOW, SCOTLAND.

FLEXIBLE EXPANSION-COUPLING FOR ROTARY SHAFTS.

1,358,467. Specification of Letters Patent. Patented Nov. 9, 1920.

Application filed June 3, 1919. Serial No. 301,515.

*To all whom it may concern:*

Be it known that I, WILLIAM ROBERTSON, of 233 Langlands Road, Govan, Glasgow, Scotland, a subject of the King of Great Britain, have invented a certain new and useful Improved Flexible Expansion-Coupling for Rotary Shafts, of which the following is a specification.

This invention relates to what are known as flexible expansion couplings for coupling shafts which are out of alinement or which are liable to get out of alinement under working conditions.

In the propulsion of ships by means of geared turbines it is very essential there should be a strong and reliable flexible expansion-coupling between the rotor shaft and the gear pinion shaft and the object of the present invention is to provide such a coupling. The coupling although specially applicable for geared turbines can be used generally in connection with shafting which is out of alinement.

Under this invention the required flexibility is obtained by a universal movement due to the co-action of a part spherical boss or collar with socket keys therein and fulcrum blocks within which pins on the socket pins can pivot. There are two joints one on the driving and the other on the driven shaft and the fulcrum blocks of both are so fitted to an inclosing sleeve coupling as to allow freedom of longitudinal movement due to expansion and contraction.

In order that the invention may be clearly understood I have hereunto appended explanatory drawings showing, by way of example, one mode of carrying the same into effect or practice.

Fig. 3 is an end elevation looking at one half of coupling.

Figure 1:
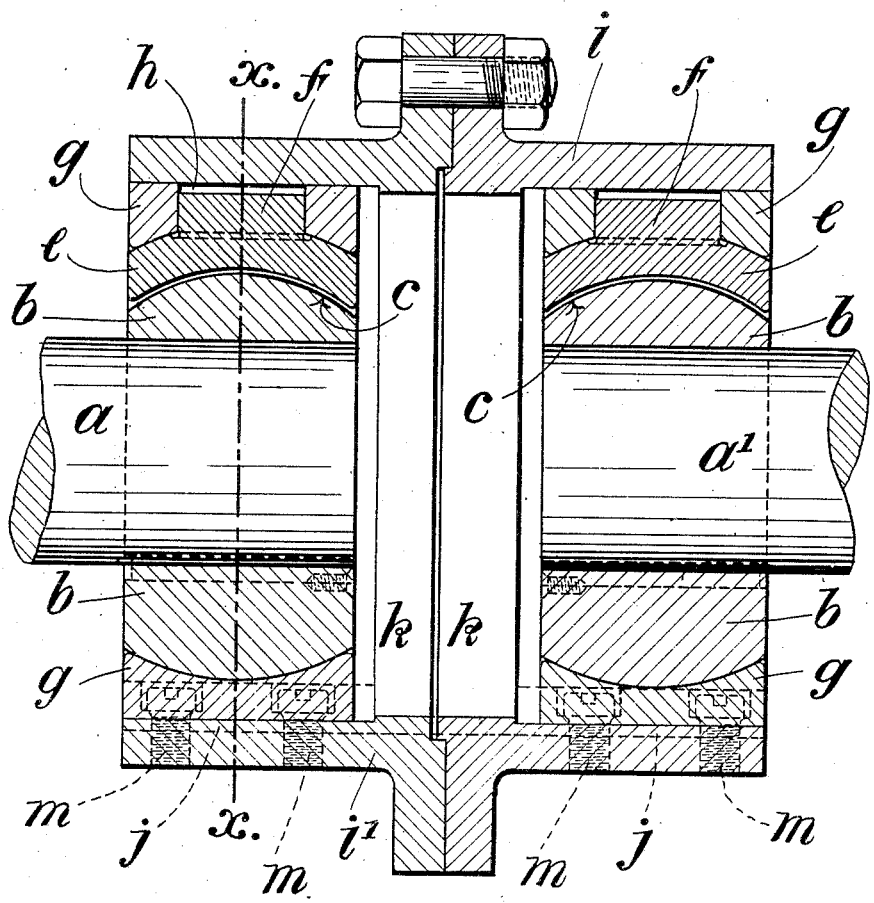
Figure 1 is a vertical longitudinal section of the coupling, on the line $y$—$y$ Fig. 2.
Figure 2:
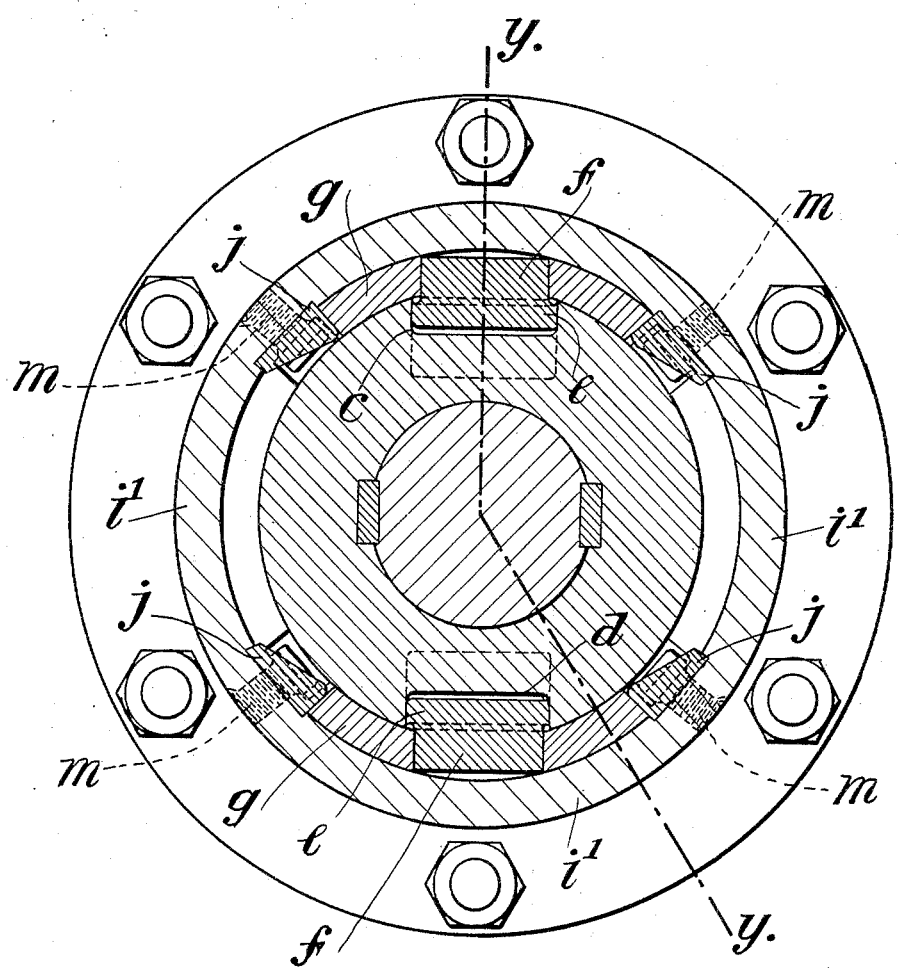
Fig. 2 is a vertical cross section on the line $x$—$x$ Fig. 1.

Figs. 4 and 4ª are views of a socket key.

Figs. 5 and 5ª are views of a fulcrum block.

The driving shaft $a$ has keyed or otherwise secured to it a ring or boss $b$ which, externally, is spherically curved and cut longitudinally in the surface of this spherosegmental boss and with corresponding curvature longitudinally are two key ways $c$, $d$, these being made at diametrically opposite parts and being parallel to each other. Fitted, with a working fit, into each key way is a socket key $e$ whose internal curvature corresponds to the curvature of the key way and each socket key has a radially projecting pin $f$. The exterior surface of each key is spherically curved, the curvature corresponding to the curvature of the boss and, when the key is dropped into place, it lies flush with the surface of the boss but with the pin projecting outward. Fitted over each socket key is a fulcrum block $g$ having a hole $h$ to fit over the socket pin and these blocks, which are disposed circumferentially, are curved internally to the curvature of the boss and to the external curvature of the socket keys so that the boss and keys may work freely therein, but externally are curved concentrically with the shaft and to fit in the cylindrical sleeve $i$, $i^1$.

The joint on the driven shaft $a^1$ has its parts exactly similar, the parts being marked with the same letters.

The cylindrical sleeve which is made in two parts $i$, $i^1$, is slid over the fulcrum blocks $g$ and bolted together. Each part has a shoulder $k$ to restrict axial movement of the sleeve. The fulcrum blocks are held slidably in position in the sleeve by means of parallel keys $j$ secured by screws $m$, or, alternatively, the parallel keys may be formed solid with the sleeve.

Although I have referred to two socket keys with their radial pins for each joint it is obvious there may be more than two employed, the parts being made accordingly.

The drive passes from the driving shaft $a$, through boss $b$, socket pins $f$ and fulcrum blocks $g$ of the one joint to the sleeve $i$ and thence by fulcrum blocks $g$, socket pins $f$ and boss $b$ of the other joint to the driven shaft $a^1$.

A great advantage of the coupling is that it can be cheaply made and easily fitted together and that the socket keys and fulcrum blocks can be easily removed and renewed if necessary.

In action, the bosses move within the socket keys whose pins can pivot in the fulcrum blocks which latter can slide in the outer sleeve.

Having now fully described my invention what I claim and desire to secure by Letters Patent is:—

1. A flexible expansion coupling for rotary shafts comprising two joints, one for the driving shaft and one for the driven shaft, both joints being inclosed within and connected with a cylindrical coupling sleeve in such a manner as to allow of axial extension of the shafts therein and each joint comprising co-acting spherically curved boss, socket keys and fulcrum blocks within which latter, pins, on the socket keys, can pivot.

2. A flexible expansion coupling for rotary shafts comprising two joints, one for the driving shaft and one for the driven shaft, both joints being inclosed within a sleeve and each joint comprising a boss with key ways therein, socket keys fitted in said key ways, a pin on each socket key and fulcrum blocks engaging said pins and permitting pivotal action thereof, the said fulcrum blocks being slidable rectilinearly in but turnably connected with said sleeve and means for guiding said fulcrum blocks.

3. A flexible expansion coupling for rotary shafts comprising two joints, one for the driving shaft and one for the driven shaft, both joints being inclosed within a cylindrical sleeve and each joint comprising an externally curved boss with key ways therein, socket keys fitted in said key ways, said socket keys being curved internally and externally, a radial pin on each socket key and fulcrum blocks with holes therein engaging said pins said fulcrum blocks being curved internally to conform to the curvature of the boss and externally to conform to the internal curvature of the cylindrical sleeve and means for holding said fulcrum blocks in position in the sleeve in such manner that they can slide rectilinearly within the sleeve.

4. A flexible expansion coupling for rotary shafts comprising two joints, one for the driving shaft and one for the driven shaft, both joints being inclosed within a cylindrical sleeve and each joint comprising an externally curved boss with key ways therein, socket keys fitted in said key ways, said socket keys being curved internally and externally, a radial pin on each socket key and fulcrum blocks with holes therein engaging said pins said fulcrum blocks being curved internally to conform to the curvature of the boss and externally to conform to the internal curvature of the sleeve and parallel keys fitted in the sleeve and so holding said fulcrum blocks in position that they can slide axially while rotating with the sleeve.

5. A flexible expansion coupling for rotary shafts comprising a cylindrical sleeve made in two portions bolted together each portion having a cylindrical inner surface with internal shoulder, two joints, one for the driving shaft and one for the driven shaft, both joints being inclosed within and connected with the coupling sleeve while allowing of axial extension of the shafts and each joint comprising co-acting spherically curved boss, socket keys and rectilinearly slidable fulcrum blocks within which latter, pins, on the socket keys, can pivot.

In testimony whereof I affix my signature in presence of two witnesses.

WILLIAM ROBERTSON.

Witnesses:
 JOHN STOTT,
 JAS. COWAN DUNLOP.